US006480487B1

United States Patent
Wegleitner et al.

(10) Patent No.: US 6,480,487 B1
(45) Date of Patent: Nov. 12, 2002

(54) DIGITAL LOOP CARRIER REMOTE TERMINAL HAVING INTEGRATED DIGITAL SUBSCRIBER PLUG-IN LINE CARDS FOR MULTIPLEXING OF TELEPHONE AND BROADBAND SIGNALS

(75) Inventors: Mark A. Wegleitner, Vienna, VA (US); Kenneth R. Brooks, Middletown, MD (US)

(73) Assignee: Verizon Services Group, Arlington, VA (US)

( * ) Notice: Subject to any disclaimer, the term of this patent is extended or adjusted under 35 U.S.C. 154(b) by 0 days.

(21) Appl. No.: 09/138,406

(22) Filed: Aug. 24, 1998

(51) Int. Cl.[7] .................................................. H04J 1/02
(52) U.S. Cl. ...................................... 370/354; 370/494
(58) Field of Search ................................. 370/493, 494, 370/495, 352–356

(56) References Cited

U.S. PATENT DOCUMENTS

| | | | |
|---|---|---|---|
| 5,383,180 A | | 1/1995 | Kartalopoulos |
| 5,461,616 A | * | 10/1995 | Suzuki ........................ 370/438 |
| 5,534,912 A | | 7/1996 | Kostreski |
| 5,544,161 A | | 8/1996 | Bigham et al. |
| 5,583,863 A | | 12/1996 | Darr, Jr. et al. |
| 5,608,447 A | | 3/1997 | Farry et al. |
| 5,640,387 A | | 6/1997 | Takahashi et al. |
| 5,842,111 A | * | 11/1998 | Byers ......................... 725/106 |
| 5,859,895 A | * | 1/1999 | Pomp et al. ................. 359/167 |
| 5,905,781 A | * | 5/1999 | McHale et al. ........... 379/93.06 |
| 6,002,502 A | * | 12/1999 | Pomp et al. ................. 359/117 |
| 6,005,873 A | * | 12/1999 | Amit .......................... 370/494 |
| 6,078,649 A | * | 6/2000 | Small et al. ................... 379/39 |

* cited by examiner

Primary Examiner—Melvin Marcelo
(74) Attorney, Agent, or Firm—Leonard D. Suchyta; Loren C. Swingle; Glenn E. Forbis

(57) ABSTRACT

A fiber-based digital loop carrier (DLC) system provides multiplexed optical transport for telephone line circuits between a terminal in a central office and a remote terminal. The remote terminal performs the multiplexing and demultiplexing for interfacing channels on the fiber(s) to individual subscriber line circuits. To expand the capacity of DLC systems to carry broadband services, fibers are run from broadband terminations in the central office to the remote terminal. The remote terminal includes interfaces for coupling to optical fibers, for two-way telephone communications and for broadband communications. This terminal also includes a line card rack, for mounting various line cards and providing appropriate connections of the cards to the channels through the fiber interfaces. Some of the line cards provide normal telephone type service connections for one or more telephone lines. One or more of the line cards supports xDSL technology, for example Asymmetric Digital Subscriber Line (ADSL) type service. An ADSL line provides multiplexed transport of two-way telephone service signals, and one or more downstream and corresponding upstream digital broadband channel. The ADSL line card connects to one or more narrowband channels for telephone service and signaling communications and connects to a broadband channel, through backplane buses of the remote terminal. The ADSL line card also performs the digital encoding and multiplexing/demultiplexing of the narrowband and broadband communications for transport over a wire pair together with analog or ISDN type telephone signals.

33 Claims, 3 Drawing Sheets

DIGITAL LOOP CARRIER REMOTE TERMINAL HAVING INTEGRATED DIGITAL SUBSCRIBER PLUG-IN LINE CARDS FOR MULTIPLEXING OF TELEPHONE AND BROADBAND SIGNALS

BACKGROUND OF THE INVENTION

TECHNICAL FIELD

The present invention relates to remote terminals for use in digital loop carrier transmission systems, more specifically to terminals configured for providing broadband services such as video and high speed data to subscribers in the digital loop carrier serving area.

DESCRIPTION OF RELATED ART

Public switched telephone networks have served subscribers by transporting telephone signals between a central office and customer premises equipment using a subscriber loop, also referred to as the local loop. The local loop is composed of wires, poles, terminals, conduits, and other outside plant that connect customer premises equipment to the central office of the local exchange carrier. The distance that a copper subscriber loop can be extended from a given central office can be many thousands of feet.

Loop carrier systems have been developed to improve the economics of loop deployment for services such as POTS and ISDN in a given central office. In subscriber loop carrier (SLC) systems, such as digital loop carrier (DLC) systems, bidirectional communication usually occurs between a central office (e.g., a local digital switch), a central office terminal (COT) and a remote terminal (RT), located in the vicinity of a customer's premises. Information is transferred between the central office and the COT according to Bellcore TR-008, TR-57, and TR-303 interface standards. Information between the COT and RT is carried as 64 kb/s encoded digital channels multiplexed on an optical transport, for example an OC-3 SONET transport. The remote terminal includes optical to electrical interfaces for converting the OC-3 signal from the incoming optical fiber into an electrical signal, and a demultiplexer for demultiplexing the 64 kb/s digital telephone channels, which are directed to telephone line cards. Each telephone line card is usually configured to serve several customers, according to either POTS or ISDN protocol via respective copper pairs supplying two-way telephone signals to respective subscriber premises equipment.

Proposals have been suggested for utilizing the digital loop carrier infrastructure to provide transmission of broadband data, for example high speed data, multimedia or video services. One proposal suggests reserving a portion of the OC-3 transport capacity of the optical fibers between the COT and the remote terminal for broadband data, where a second broadband facility is output from the remote terminal to an adjacent remote terminal. Alternatively, a fiber may be run from the central office to the second remote terminal direct from the central office. In either case, the second terminal has asymmetrical digital subscriber line (ADSL) modem or other broadband line cards. The broadband data is passed via the second broadband facility, e.g. from the first remote terminal (having telephone line cards), to the second remote terminal (having broadband line cards) to modulate the broadband data onto the subscriber loops.

Such an arrangement, however, suffers from the disadvantage that an additional remote terminal must be installed adjacent to the existing remote terminal providing telephone service. This arrangement involves substantially increased costs associated with the expense of an additional remote terminal, plus legal issues involving the necessity of additional right-of-way for the additional remote terminals. Moreover, the ADSL modem cards cannot be connected to the corresponding subscriber loops without providing a tap between each of the twisted wire pair connections between the first remote terminal and the second remote terminal. This further increases costs due to manual rewiring and decreased stability due to substantially complex twisted pair connections.

U.S. Pat. Nos. 5,534,912 to Kostreski and 5,608,447 to Farry et al., the disclosures of which are incorporated in their entirety by reference, illustrate video networks that use ADSL modems for supplying broadband video data to a subscriber. For example, FIG. 4 of U.S. Pat. No. 5,534,912 to Kostreski discloses ADSL "muldems" that modulate video signals onto different frequencies and a frequency combiner 320 that outputs the modulated video signals as a combined spectrum to an intermediate distribution point 330 via a fiber plant. The intermediate distribution point 330 includes a plurality of ADSL filter/combiners 355. Each ADSL filter/combiner unit 355 receives a copper twisted wire pair for a selected subscriber from the standard telephone facilities 365, frequency multiplexes the telephone signals with the ADSL-modulated signals, and supplies the frequency multiplexed signals to the subscriber premises 360 via a copper twisted wire pair. The remote ADSL unit 305' at the subscriber location 360 receives and demultiplexes the various telephone, video, and embedded operations channel (EOC) and control signals for use as required.

U.S. Pat. No. 5,608,447 to Farry et al. discloses in FIG. 11 an intelligent access peripheral (IAP) having an ADSL unit that frequency multiplexes broadband data onto subscriber loops. In particular, the IAP has a first port that receives broadcast video in ATM cell format from a broadcast headend, a second port that receives a second ATM cell stream carrying non-broadcast (point-to-point) data, and a third port that receives a copper pair (POTS) connection from a POTS switch. The IAP extracts the ATM cell streams from the first and second ports, and outputs digital video information and the telephone signals (POTS or ISDN) to the subscriber premises.

As is apparent from the foregoing, both U.S. Pat. Nos. 5,534,912 to Kostreski and 5,608,447 to Farry et al. require a separate distribution component (e.g., intermediate distribution point 330 or IAP) that requires a twisted pair connection from a POTS switch in order to multiplex digital video data with the corresponding telephone signals for transmission as a combined spectrum signal to a subscriber. As described above, these broadband distribution points, if implemented in a digital loop carrier serving area, would still require installation of the broadband distribution unit in addition to the existing remote terminal. Moreover, the broadband distribution units would still require a tap between each of the twisted wire pair connections from the remote terminal to the broadband distribution units in order to provide telephone service. Hence, the Kostreski and Farry et al. patents still suffer from the disadvantage of requiring a second distribution unit in addition to an existing remote terminal, plus the necessity of a tap between each of the twisted pair connections between the original remote terminal and the broadband distribution units.

SUMMARY OF THE INVENTION

There is a need for an arrangement for adding broadband services in an existing digital loop carrier system having a remote terminal configured for transporting information between a central office and the subscriber premises by respective subscriber loops, in a manner that avoids installation of additional remote terminals within the digital loop carrier system.

There is also a need for an arrangement that enables transport of broadband data in a digital loop carrier system, without requiring labor-intensive taps to be installed between POTS line interface cards and separate xDSL equipment.

There is also a need for providing broadband data services to subscribers in a digital loop carrier serving area, without the necessity of installing a separate distribution infrastructure to the subscriber premises equipment for the broadband data services.

These and other needs are attained by the present invention, where a remote terminal configured for providing communication between a central office and subscriber premises equipment within a digital loop carrier serving area includes integrated subscriber line circuits. The integrated subscriber line circuits are configured for providing either a downstream broadband data connection or both telephone-based connections and a downstream broadband data connection for each subscriber loop served by the integrated subscriber line circuits.

According to one aspect of the present invention, a remote terminal provides communication between a central office and subscriber premises equipment within a prescribed serving area. The remote terminal comprises a first bus for carrying digitally multiplexed narrowband data channels to and from the central office, a second bus for carrying digitally multiplexed broadband data channels, and a set of first subscriber line circuits, connected to the first bus, for logically connecting first subscriber loops serving a first group of subscribers to the narrowband data channels. The remote terminal also includes a set of second subscriber line circuits, connected to the first bus and the second bus, for logically connecting second subscriber loops serving a second group of subscribers to the narrowband data channels and the broadband channels, and a terminal controller for controlling logical connections between the first subscriber loops and the narrowband data channels, and between the second subscriber loops and the narrowband data channels and the broadband channels. The first subscriber line circuits provide conventional telephone service to the first group of subscribers, while the second subscriber line circuits provide enhanced telephone and broadband services to second subscriber loops by logically connecting the second subscriber loops to the narrowband data channels of the central office and the digitally multiplexed broadband channels. The broadband channels provide broadband data, for example from a broadband source such as a broadband information provider. Hence, the remote terminal can be used to provide both conventional telephone service, plus telephone and broadband services by integrating a broadband connection from a broadband data source with the narrowband data channels used for telephone communications between the central office and the subscribers in the prescribed serving area. The remote terminal may also be used to serve broadband-only subscribers without the need for a second remote terminal.

Another aspect of the present invention provides a remote terminal for providing communication between a central office and subscriber premises equipment within a digital loop carrier serving area. The remote terminal comprises digital subscriber line circuits, each receiving digitally multiplexed narrowband data channels from the central office and digitally multiplexed broadband data channels from a broadband data source, and each configured for selectively establishing a two-way narrowband data connection between the central office and at least one corresponding subscriber loop on a corresponding selected one of the digitally multiplexed narrowband data channels, and a two-way communication interface between the at least one corresponding subscriber loop and a broadband data source on one of the digitally multiplexed broadband data channels. The remote terminal also includes a controller for logically controlling establishment of the two-way narrowband data connections and the two-way communication interfaces by the digital subscriber line circuits. The digital subscriber line circuits each provide a two-way narrowband data connection, for example for telephone service, and a two-way communication interface for interactive broadband communications between the subscribers in the digital loop carrier serving area and a broadband information provider. Hence, broadband services can be provided to subscribers in a digital loop carrier serving area, without the necessity of building additional distribution infrastructure for broadband services. Moreover, the remote terminal enables ubiquitous service to be provided in a given central office area, where subscribers served by copper from a central office and remote terminal subscribers can both obtain service upgrades by changing the office equipment for the corresponding twisted pair. Hence, subscribers can obtain the same service, regardless of whether the subscribers have copper-based service (i.e., twisted wire pair connections to central office equipment) or carrier-based service with a remote terminal.

Still another aspect of the present invention provides a multichannel information distribution system for supplying communication between a central office and subscribers in a digital loop carrier serving area, the system comprising a first set of optical fibers carrying digitally multiplexed voice channels from the central office, a second set of optical fibers carrying digitally multiplexed broadband data channels from a broadband source, and a remote terminal connected to the first and second sets of optical fibers. The remote terminal includes digital subscriber line circuits, each digital subscriber line circuit establishing a two-way connection between at least one subscriber premises equipment and the central office, a downstream broadband connection between the broadband source and the corresponding at least one subscriber premises equipment, and an upstream data connection between the at least one subscriber premises equipment and an information provider supplying broadband data via the corresponding downstream broadband connection. The system also includes a plurality of subscriber loops, each carrying signals between the remote terminal and the corresponding subscriber premises equipment associated with the two-way connection, the downstream broadband connection, and the upstream data connection. Use of digital subscriber line circuits capable of establishing the two-way connection, the downstream broadband connection and the upstream data connection enable each subscriber premises equipment to concurrently receive both telephone and interactive broadband data services in a digital loop carrier serving area, without the necessity of installation of a separate broadband network distribution infrastructure. Moreover, a subscriber having only telephone service can easily be upgraded to receive broadband service by changing the corresponding line circuit from the first subscriber line circuit to the second subscriber line circuit. Hence, subscriber services can be upgraded merely by changing the appropriate line circuit serving the corresponding subscriber.

Still another aspect of the present invention provides a method of providing communication between a central office and central office subscribers in a digital loop carrier serving area. The method includes receiving, by a remote terminal serving the central office subscribers, digitally multiplexed voice channels from the central office via an optical fiber, receiving digitally multiplexed broadband data channels by the remote terminal, and selectively establishing in an integrated remote terminal line card, for each subscriber loop serving a corresponding subscriber premises equipment, at least one of a two-way communication interface between the corresponding subscriber premises equipment and the central office, a downstream broadband connection for supplying broadband data from one of the broadband data channels to the corresponding subscriber loop, and an upstream data connection for outputting data received from the corresponding subscriber loop to a service provider supplying the broadband data.

Yet another aspect of the present invention provides an integrated digital subscriber plug-in line card comprising a multiplexer/demultiplexer for logically connecting a plurality of two-way narrowband data paths serving respective subscriber loops to a bus configured for carrying digitally multiplexed narrowband data between the integrated digital subscriber plug-in line card and a central office, and telephone line interface units for connecting the two-way narrowband data paths by sending/receiving telephone signals for the respective subscriber loops. The integrated digital subscriber plug-in line card also includes a broadband data terminal adapter configured for receiving a digitally multiplexed broadband data stream and outputting a plurality of demultiplexed broadband data streams for the respective subscriber loops, the broadband data terminal multiplexing upstream control data streams, received from the respective subscriber loops, onto the digitally multiplexed data stream, a plurality of digital subscriber loop modems for modulating the demultiplexed broadband data streams into downstream analog signals, respectively, and demodulating upstream subscriber loop control signals received from the subscriber loops into the upstream control data streams, respectively, and a plurality of subscriber loop multiplexer/demultiplexer circuits for transmitting the downstream analog signals and the telephone signals to the respective subscriber loops at first and second signal channels, respectively, and demultiplexing the upstream subscriber loop control signals from the respective subscriber loops at a third signal channel. The broadband terminal adapter enables the integrated digital subscriber plug-in line card to send/receive data associated with broadband data services, independent of the bus serving the central office narrowband data. Hence, the integrated digital subscriber plug-in line card enables broadband data services to be provided to a plurality of subscribers without disruption or modification of the telephony infrastructure.

Additional objects, advantages and novel features of the invention will be set forth in part in the description which follows, and in part may become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
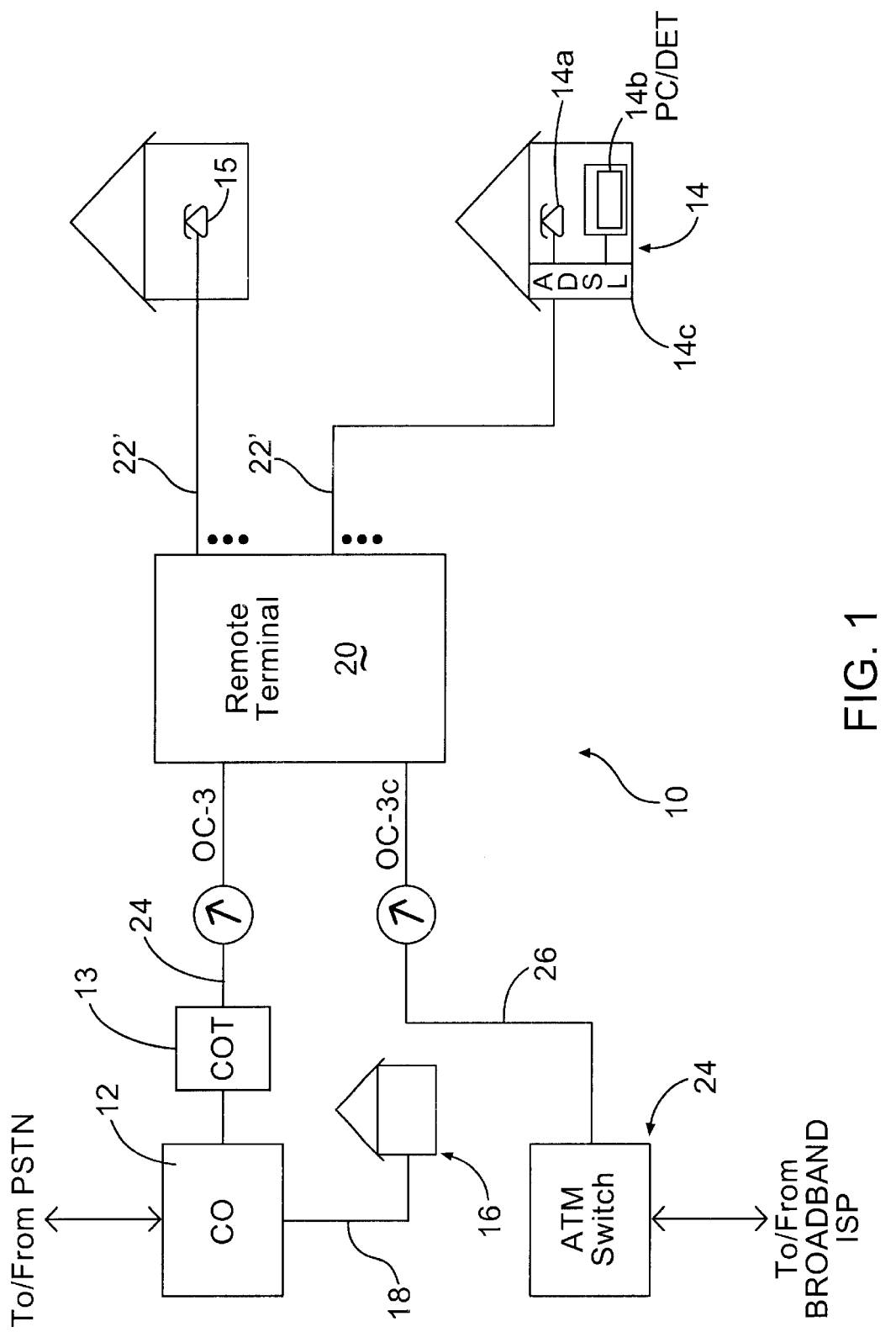
FIG. 1 is a block diagram illustrating a digital loop carrier serving area configured for providing telephone and interactive broadband services to subscribers according to an embodiment of the present invention.

FIG. 1 is a block diagram illustrating a multichannel information distribution system for supplying communication between a central office and subscribers in a digital loop carrier serving area according to an embodiment of the present invention. As shown in FIG. 1, the distribution system 10 includes a remote terminal 20, subscriber loop (e.g., twisted pair) connections 22 and 22', and optical fibers 24 and 26, described below. The distribution system 10 is configured for providing communication services between a central office (CO) 12 and subscriber premises equipment 14 and 15 without the necessity of a direct connection to the central office 12. Specifically, conventional subscriber premises equipment 16 have been connected directly to a serving central office 12 by twisted wire pair lines 18 that connected the subscriber premises equipment 16 to a subscriber loop interface, also referred to as a subscriber line card, within the central office 12. The subscriber premises equipment 16 typically needs to be located within a distance of 18,000–22,000 feet via the twisted wire pair 18 to the central office 12 for telephony-type service due to the capacity of the copper wire due to attenuation, or loss of signal strength. The data rate capacity of the twisted wire pair 18 is also dependent on the length of the wire. For example, the 6 Mb/s capacity for most ADSL systems is limited to a wire length of 8,000–9,000 feet on 26 AWG wire. In some cases, the distance can be extended for a capacity of 3 to 4 Mb/s up to 12,000 feet by using 24 gauge wire.

Subscribers beyond 9,000 copper feet are often served using a digital loop carrier system 10, where a remote terminal 20 serves as the copper interface between the central office 12 and subscriber loops 22 and 22' for connecting the subscriber premises equipment 14 and 15 within the digital loop carrier serving area, respectively. In particular, the remote terminal 20 receives a set of optical fibers 24 carrying digitally multiplexed voice channels to and from the central office 12. The optical fibers 24 often transport the voice channels using a SONET fiber transport at a bidirectional OC-3 rate. Hence, the optical fibers 24 are configured for transporting 2016 DS0 channels, where each DS0 voice channel transports voice data at 64 Kb/s per channel. According to the disclosed embodiment, the CO 12 and the COT 13 transport narrowband data such as voice data via the bidirectional voice channels on the optical fibers 24 in compliance with the Bellcore TR-008, TR-57 or TR-303 interface standards. The TR-008 and/or the TR-303 interface enable the COT 13 to directly interface with the digital switching system in the central office 12. The digital facilities may be a DS1 or higher rate digital facility on a metallic transmission medium.

As described below, the remote terminal 20 includes a multiplexing capabilities for establishing a two-way telephone connection for each subscriber premises telephone equipment 14a and 15 by selectively outputting the narrowband data received by the remote terminal 20 to and from the optical fibers 24 and the appropriate twisted wire copper pair connection forming the subscriber loop 22 or 22'. The remote terminal 20 also includes subscriber line circuits for logically connecting the subscriber loop 22 or 22' to a selected one of the narrowband data channels transported by the optical fibers 24.

Certain subscribers served by the digital loop carrier system 10 may require only telephone-type service, since the subscriber may only have telephone equipment 15 as his or her subscriber premises equipment. Other subscribers, however, may request broadband only services, or enhanced telephony and broadband services, for example video on demand, or high-speed access to data networks such as the Internet. For example, the subscriber at subscriber premises 14 includes a conventional telephone 14a, plus a data terminal 14b, for example a personal computer (PC) having an Internet web browser, or a digital entertainment terminal (DET) for a video dial tone network configured for generating upstream control signals to a broadband information service provider (ISP), and for decoding broadband data received via the corresponding subscriber loop 22 from the broadband ISP. Hence, a subscriber desiring different communication services will have an broadband (e.g., ADSL) modem 14c for demultiplexing telephone signals and broadband data signals transported via the corresponding subscriber loop 22, and for receiving the upstream control signals from the PC/DET14b and outputting the upstream control signals on a prescribed upstream signaling path to the remote terminal 20 via the corresponding subscriber loop 22. Additional details describing processing of the downstream broadband data signals and generation of upstream control data by the DET 15b are disclosed in U.S. Pat. No. 5,635,979 to Kostreski et al., the disclosure of which is incorporated in its entirety herein by reference.

As described below, the remote terminal 20 includes integrated digital subscriber line circuits configured for providing both telephone service and interactive broadband service for a group of subscriber loops 22 connected to respective subscriber premises 14 requiring both telephony service and interactive broadband service. Each integrated digital subscriber line circuit is configured for establishing a downstream broadband connection between a broadband source, for example an ATM switch 24, and a selected subscriber premises equipment 14 via the corresponding subscriber loop 22. Each integrated digital subscriber line circuit also establishes a 64 kb/s or higher rate upstream data connection between the subscriber premises equipment 14 and an information provider supplying the broadband data via the corresponding downstream broadband connection.

Hence, the integrated digital subscriber line circuits integrate telephony services and interactive broadband data services on a single line card. This integrated digital subscriber line circuit, also referred to as an integrated digital subscriber plug-in line card, enables the remote terminal 20 to serve both subscriber premises 15 requiring only telephony-type service, subscriber premises requiring broadband-only type service (not shown), and subscriber premises 14 requiring both telephony-type service and interactive broadband service, by connecting the subscriber loop 22' serving a telephone-only subscriber premises to a conventional telephone line card, and connecting a subscriber loop 22 for subscriber premises 14 requiring both telephony and broadband-type services to the integrated digital subscriber line card. Hence, the remote terminal 20 can be configured to include conventional telephone line cards connected to subscriber loops 22' serving telephone-only subscribers, and integrated digital subscriber line cards for providing both telephony and interactive broadband services to customer premises 14 via the subscriber loop 22. In addition, a subscriber service may be upgraded from telephone-only to telephony plus interactive broadband by either reconnecting the corresponding twisted wire pair 22' from a conventional telephone line card to the integrated digital subscriber plug-in line card, or by replacing the telephone line card with the integrated digital subscriber plug-in line card.

Hence, the remote terminal 20 can be used to provide both telephony and interactive broadband services, without the necessity of adding a second broadband distribution terminal adjacent to the remote terminal 20 or connecting a tap between the subscriber loops from the remote terminal 20 to the broadband distribution.

As shown in FIG. 1, the remote terminal 20 receives broadband data from an ATM switch 24, configured for receiving digitally multiplexed broadband data channels in the form of ATM cell streams from a broadband information service provider (ISP). The ATM switch 24 may be part of a larger backbone subnetwork for a broadband communications network, such as a video dial tone network. An exemplary video dial tone network is described in additional detail in U.S. Pat. No. 5,544,161 to Bigham et al., the disclosure of which is incorporated in its entirety by reference.

The ATM switch 24 outputs selected broadband data on a set of optical fibers 26 carrying digitally multiplexed broadband data channels from the broadband ISP using a SONET-based ATM transmission protocol, for example OC-3 concatenated (OC-3c). The optical fibers 26 are configured for providing broadband data downstream from the ATM switch 24 to the subscriber loop premises 14, and for transporting narrowband control data from the subscriber loop premises 14 to the broadband ISP via the ATM switch 24. Alternatively, the upstream control data received by the remote terminal 20 from the subscriber loop premises 14 may be sent to the broadband ISP via the PSTN (e.g., the CO 12).

Figure 2:
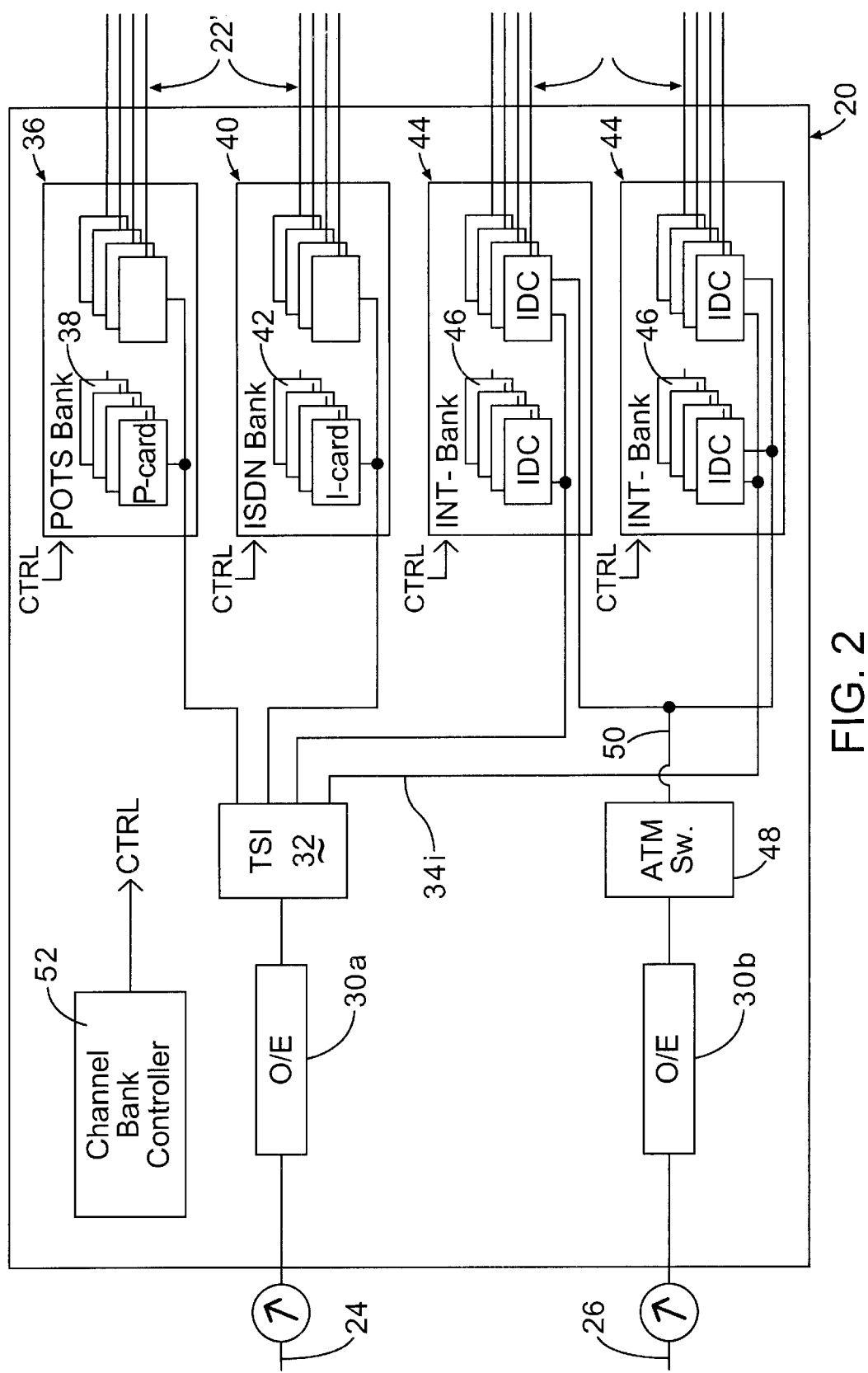
FIG. 2 is a block diagram of the remote terminal of FIG. 1.

FIG. 2 is a block diagram illustrating the remote terminal 20 according to an embodiment of the present invention. The remote terminal 20 includes optical/electrical (O/E) interfaces 30a and 30b for sending and receiving the optical OC-3 signals from the optical fibers 24 and 26, respectively. The optical fiber 24 supplies the bidirectional digitally multiplexed voice channels from the central office, and the optical fiber 26 transports digitally multiplexed broadband data channels as ATM cell streams using an OC-3c transport and may carry upstream signaling data. As described below, the remote terminal 20 selectively provides logical connections between the subscriber loops 22 and selected channels on the optical fibers 24 and 26, enabling subscribers in the digital loop carrier serving area to obtain interactive broadband services, without the necessity of installing optical fiber or coaxial cable to the subscriber premises.

As shown in FIG. 2, the remote terminal 20 includes a time slot interchange (TSI) 32 or other multiplexing functionality, a plurality of narrowband buses 34 for carrying digitally multiplexed narrowband data channels, a plurality of channel banks 36, 40, each including a plurality of subscriber line circuits for logically connecting connected subscriber loops 22' to the narrowband data channels. As shown in FIG. 2, the channel bank 36 includes a plurality of POTS subscriber line cards (P-cards) 38, and the channel bank 40 includes a plurality of ISDN subscriber line cards (I-cards) 42. The remote terminal 20 also includes a second set of integrated channel banks (INT_Banks) 44, each including a plurality of integrated digital subscriber plug-in line circuits 46. The remote terminal 20 also includes a broadband data interface 48 such as an ATM switch, and a broadband data bus configured for supplying digitally multiplexed broadband data channels as ATM cell streams to the channel banks 44 of the integrated digital subscriber line circuits (IDC) 46. The remote terminal 20 also includes a channel bank controller 52, also referred to as a terminal controller, configured for logically controlling establishment of the two-way narrowband data connection by the telephone subscriber line cards 38 and 42, and for controlling establishment of the two-way narrowband data connections and the two-way communication interfaces (i.e., broadband downstream and narrowband data upstream) by the integrated digital subscriber line circuits 46, as described below.

The time slot interchange (TSI) 32 selectively outputs the narrowband data received by the optical interface 30a onto a selected one of a plurality of narrowband buses 34. The TSI 32 is configured for logically connecting a subscriber premises 14 initiating a telephone call by transferring in two directions narrowband data to and from the central office 12 via a selected one of the digitally multiplexed narrowband data channels on the optical fiber 24 (intermodule call connection).

The channel banks 36, 40 and 44 are preferably mounted within the remote terminal 20 using line card cages configured for holding a conventional POTS line card 38, or ISDN line card 42. Use of a conventional telephone line card, also referred to as a telephone subscriber line circuit (38 or 42), enables the remote terminal 20 to be used for conventional telephone services for subscribers who desire only conventional POTS-type or ISDN telephone service. Hence, the channel banks 36 and 40 having the POTS line cards 38 and the ISDN line cards 42, respectively, need only be connected to the narrowband bus 34 for logical connections to the central office 12 via the optical fiber 24.

If a subscriber in a digital loop carrier serving area desires to have broadband service, for example digital video service or Internet access service requiring downstream broadband data transport of 1.5 Mb/s to 6 Mb/s, the service can be implemented by connecting the subscriber loop to one of the digital subscriber line circuits 46. As shown in FIG. 2, each digital subscriber line circuit 44, preferably implemented as a subscriber plug-in line card, is connected to the narrowband data bus 34 for two-way communications with the central office 12. Each of the digital subscriber line circuits 46 is also connected to the broadband data interface (e.g., an ATM switch) 48 via the broadband bus 50 carrying digitally multiplexed broadband data channels in the form of ATM cell streams from the ATM switch 48. As described below, each digital subscriber line circuit 46 is configured for establishing a two-way connection between at least one corresponding subscriber premises equipment 14 via the corresponding subscriber loop 22 and the central office 12. According to the disclosed embodiment, each digital subscriber line circuit 46 is configured for connecting up to four twisted wire pair connections for the respective four subscriber loops 22. Hence, each digital subscriber line circuit 46 provides connections for up to four subscriber premises 14. The disclosed digital subscriber line circuit may be configured to serve more subscribers (e.g., six), if desired. Each digital subscriber line circuit 46 also is configured for establishing a downstream broadband connection between the broadband ISP (via the ATM switch 24) and the corresponding subscriber premises equipment 14, in conjunction with an upstream data connection between the corresponding subscriber premises equipment 14 and the broadband ISP supplying the broadband data.

Figure 3:
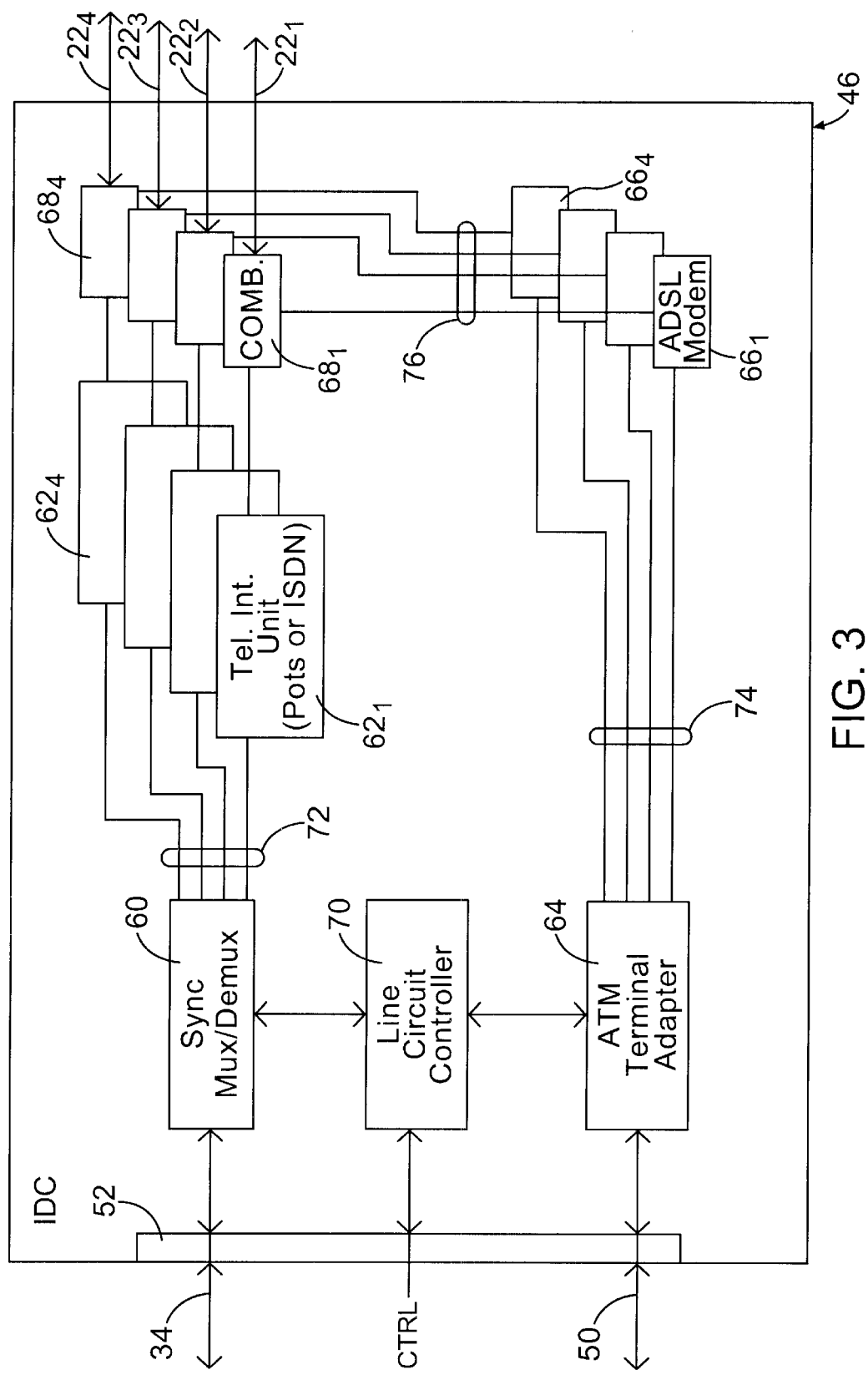
FIG. 3 is a diagram illustrating the integrated digital subscriber plug-in card of FIG. 2.

FIG. 3 is a block diagram illustrating the digital subscriber line card 46, also referred to as the digital subscriber line circuit. Each digital subscriber line circuit 46 is configured for establishing, for each subscriber loop 22, a two-way narrowband (e.g., voice-grade) communication with the central office 12, a downstream broadband connection, and an upstream data connection based on control signals (CTRL) received from the channel bank controller 52.

As shown in FIG. 3, the digital subscriber line circuit 46, also referred to as a digital subscriber plug-in line card, is configured for simultaneous two-way narrowband (telephone) connection, downstream broadband data connections, and upstream control data connection for the subscriber loops $22_1$, $22_2$, $22_3$, and $22_4$. The digital subscriber plug-in line card includes both telephone line interface units for POTS or ISDN connections, and broadband modems (e.g., xDSL modems) for multiplexing of downstream broadband and upstream control data multiplexed onto a single twisted wire pair $22_i$. Hence, the digital subscriber line circuit 46 is also referred to as an integrated digital subscriber plug-in line card, where the telephone line interface unit for each subscriber is combined with a broadband modem on a single plug-in line card to provide an integrated card offering both telephone services and broadband services for a plurality of subscriber loop premises equipment 14. The term "plug-in" refers to implementation of the integrated digital subscriber line circuit on a printed circuit board having edge contacts 52. Insertion of the plug-in line card into a mating female connection makes the necessary connections to the three buses 34, 50, and CTRL, as well as additional miscellaneous connections (not shown), for example, power, maintenance, etc.

As shown in FIG. 3, the integrated digital subscriber plug-in line card 46 includes a synchronous multiplexer/demultiplexer 60, a plurality of telephone line interface units 62, a broadband terminal adapter 64, a plurality of broadband modems (e.g., ADSL modems) 66, a plurality of combiner circuits 68, and a line circuit controller 70. The plug-in line card 46 also includes a plug-in connector interface 52 that includes the edge contacts necessary for connecting the synchronous mux/demux 60, the controller 70, and the terminal adapter 64 to the narrowband bus 34, the CTRL signal path, and the broadband data bus 50, respectively. The synchronous multiplexer/demultiplexer 60 is configured for logically connecting two-way narrowband data paths 72 serving the respective subscriber loops 22 to the narrowband bus 34 carrying digitally multiplexed narrowband data. In particular, the line circuit controller 70 receives control information (CTRL) from the channel bank controller 52 specifying the time slot sequence allocated for use by the synchronous multiplexer/demultiplexer 60 to send and receive narrowband voice data packets on the narrowband bus 34. The telephone line interface unit 62, implemented as either a POTS subscriber line card or an ISDN subscriber line card, provides two-way transfer of digital voice data packets between the multiplexer/demultiplexer 60 via the corresponding data path 72. In the case of a POTS interface unit, the POTS interface unit converts the digital words received from the sync mux/demux 60 into analog signals for transmission onto the corresponding subscriber loop 22. The telephone line interface unit 62 outputs the analog POTS signal or ISDN signal at a prescribed frequency range to a combiner 68 for frequency multiplexing of broadband signals, described below. For an analog type telephone line (POTS), one of the line interface units $62_i$ provides two-way conversion between analog and digital signals. The POTS interface unit $62_i$ also provides normal telephone line functions, such as battery feed, over-voltage protection, ringing, signaling, coding, hybrid and testing (commonly collectively identified as the 'BORSCHT' functions of the telephone industry).

The combiner circuit 68 multiplexes the downstream analog signals into a combined subscriber signal, and outputs the combined subscriber signal onto the corresponding subscriber loop 22. The combiner circuit 68 also demultiplexes upstream signals, namely upstream telephone signals and upstream control data signals, and outputs the demultiplexed signals to the telephone interface unit 62 and the broadband (e.g., ADSL) modem 66, respectively.

The broadband terminal adapter 64, implemented as an ATM terminal adapter, is configured for outputting digital data recovered from selected ATM cells on the broadband data bus 50 based on a prescribed group of virtual VPI/VCI addresses specified by the line circuit controller 70 under the control of the channel bank controller 52. The ATM terminal adapter 64 also outputs onto the bus 50 ATM cell streams carrying upstream control data received from the subscriber loops 22. In particular, the ATM terminal adapter operates according to the ATM User Network Interface (UNI) specification 3.1, established by the ATM Forum, Inc. or later versions such as 4.0. The ATM UNI 3.1 standard enables developers to build equipment that will fully interoperate in public and private ATM network environments. Specifically, each ATM cell supplied via the broadband bus 50 contains a 5 byte header. The header includes a 4 bit generic flow control field, an 8 bit virtual path indicator (VPI), a 16 bit virtual circuit indicator (VCI), a 3 bit payload type field, a 1 bit cell loss priority field, and an 8 bit cyclic redundancy check (CRC). The VPI/VCI is used by the ATM terminal adapter 64 to determine whether a given ATM cell includes payload data to be output onto one of the digital data paths 74 serving a corresponding subscriber loop $22_i$. The payload type field is typically used to distinguish between new subscriber traffic and operation, administration, and management (OAM) traffic. The cell loss priority bit, if set, indicates that a packet may be dropped, if necessary.

According to the disclosed embodiment, the ATM terminal adapter 64 may be implemented for outputting onto each high speed digital data path 74 an ATM cell stream having a prescribed virtual address for transmission of the ATM cell stream via the subscriber loop 22. The ATM terminal adapter 64 monitors the digitally multiplexed broadband data channels on the broadband data bus 50 carrying ATM cell streams, and determines whether ATM cells within the data streams should be passed to a selected one of the high speed digital signal paths 74 or blocked. Specifically, each ATM cell is mapped on the basis of its corresponding VPI/VCI header either to a valid output port serving the corresponding digital data path $74_i$, or to a null port (i.e., blocked). The ATM cells having a VPI/VCI corresponding to an established downstream broadband connection are output to the identified digital path $74_i$ at a specified data rate. The ATM terminal adapter 64 is also configured for receiving ATM cell streams from each of the digital data paths 74 carrying upstream control data from the corresponding subscriber loop 22. In particular, the ATM terminal adapter 64 checks the VPI/VCI of the upstream ATM cells, and outputs the received ATM cells onto the broadband bus 50 on one of the digitally multiplexed broadband data channels if the VPI/VCI is a valid address. Hence, the ATM terminal adapter 64 may be implemented to selectively demultiplex ATM cell streams carrying broadband data from the broadband bus 50 onto the appropriate digital signal path 74, and multiplex ATM cell streams carrying upstream control data from the respective digital signal paths 74 onto the broadband bus 50.

Alternatively, the ATM terminal adapter 64 may be configured for recovering the broadband data from the payload of the received ATM cell streams and outputting the recovered broadband data onto the high speed data path 74 using an alternative transport protocol, for example Ethernet (IEEE 802.3), TCP/IP, or IPv6. In this case, the ATM terminal adapter 64 performs adaptation layer processing (e.g., AAL-5) to reassemble the ATM cell payloads to recover the broadband data units for transmission on the appropriate broadband signal path 74 according to an alternative transport protocol, for example TCP/IP, Ethernet (IEEE 802.3), or IPv6. In particular, the ATM terminal adapter 64 demultiplexes incoming ATM cell streams based on the appropriate VPI/VCI header information, as described above. The ATM terminal adapter 64 then performs AAL-5 processing by buffering cells having the appropriate VPI/VCI value until a cell is found having an ATM cell adaptation unit (AAU) value of "0" in its header (first cell) and another cell having an AAU value of "1" in its header (last cell). The ATM terminal adapter 64 counts the number of cells from the first to last to determine the type of adaptation used to map cells.

If the ATM terminal adapter 64 has captured five cells, for example, the terminal adapter 64 extracts the payload data and uses the CRC data to check for errors. If there are no errors, the original data is reconstructed from the appropriate bytes of payload data from the first four cells. Similarly, if the receiver has captured eight cells, the receiver pulls up the payload data, performs the CRC-based error check, and reconstructs the original data (e.g., payload data units) from the appropriate bytes of payload data from the eight cells. The recovered payload data unit may be a broadband data packet, such as an MPEG2-encoded data packet. In the case of transport using IP-based addressing, the recovered payload data unit is output as an IP packet onto the appropriate signal path 74 for downstream transport of the broadband data on the corresponding subscriber loop 22. Similarly, upstream control data received by the ATM terminal adapter 64 from the data path 74 are converted into ATM cell streams and output onto the broadband data bus 50. Additional details related to multiplexing and demultiplexing of ATM cell streams are disclosed in U.S. Pat. No. 5,544,161 to Bigham et al., the disclosure of which is incorporated in its entirety by reference. As known in the art, a number of other adaptation and reverse adaptation routines are used to transport other types of data, e.g., Internet Protocol (IP) data, over ATM.

The broadband downstream data on each of the digital signal paths 74 are supplied to a corresponding digital subscriber loop modem 66, also referred to as a broadband data modem, implemented for example as an asymmetrical digital subscriber line (ADSL) modem. Each ADSL modem 66 is configured for modulating broadband data having data rates of up to 6–8 Mb/s into a modulated analog signal for transmission to the subscriber premises equipment 14 via the corresponded twisted pair 22. The ADSL modem 66 also receives modulated upstream analog signals from the corresponding subscriber loop 22, and demodulates the upstream analog signal to recover the upstream data for transmission to the ATM terminal adapter 64 via the corresponding digital signal path 74. Hence, each ADSL modem 66 performs ADSL processing for downstream broadband data. Each ADSL modem 66 thus output modulates the downstream broadband data into downstream analog signals, and outputs the downstream analog signal to the combiners 68 via analog signal paths 76, respectively.

Each combiner 68 is configured for frequency multiplexing and demultiplexing the downstream analog signal carrying the broadband data, the two-way telephone signals (POTS or ISDN), and the upstream data signals. Hence, the combiner circuit 68 creates three information channels, namely a high speed downstream channel, a medium speed upstream channel, and two telephone (e.g., POTS) channels. The POTS channel is split off from the ADSL modem 66 by filters, guaranteeing uninterrupted POTS service, even if the ADSL modem 66 were to fail. The high speed downstream channel typically ranges from 500 kb/s to 8 Mb/s, while upstream data rates typically range from 16 kb/s to 640 kb/s. Each channel can be submultiplexed to form multiple, lower rate channels. Depending on the implementation of the ATM terminal adapter 64, the ADSL modems 66 will accommodate ATM transport with variable rates in compensation for ATM overhead, as well as IP protocols. Downstream data rates depend on a number of factors, including the length of the copper line, the wire gauge, presence of bridged taps, and cross-coupled interference. Line attenuation increases with line length and frequency, and decreases as wire diameter increases. Ignoring bridged taps, it is believed the integrated line card 46 will enable data rates of 6.1 Mb/s up to 12,000 feet using a wire gauge of 24 awg. Distances of up to 18,000 feet may be obtained for data rates of 1.52 Mb/s using a wire gauge of 24 awg.

Hence, the ADSL modems 66 are particularly effective for transport of digital compressed video, for example, MPEG-2 encoded digital video. The xDSL modems 66 may incorporate forward error correction to reduce errors caused by impulse noise. Error correction on a symbol by symbol basis also may be used to reduce errors caused by continuous noise coupled into a line.

Additional details related to IP transport and ATM transport using xDSL are described in Technical Reports TR-001, "xDSL Forum System Reference Model," and TR-002, "ATM Over xDSL Recommendations," published March, 1997 by the xDSL Forum, incorporated herein in their entirety by reference.

According to the disclosed embodiment, an integrated digital subscriber plug-in line card enables users in a digital loop carrier serving area to receive both telephone service and interactive broadband services without the necessity of substantial modification to the distribution plant. Rather, subscribers can be upgraded to broadband service merely by substituting an existing telephone line card with the integrated digital subscriber plug-in line card. In addition, the architecture of the integrated digital subscriber plug-in line card logically connects telephone communications by one bus interface and interactive broadband communications by a second interface, enabling easy upgrades for digital loop carrier subscribers from telephone-only service to integrated telephone and broadband services, by substituting a POTS line interface card with the integrated plug-in line card in a remote terminal having a dual bus architecture for telephony and interactive broadband services, respectively.

Although the disclosed embodiment describes transport of broadband data using SONET and ATM transport, it will be appreciated that other transport technologies may be used. For example, the broadband data interface 48 may be implemented as an Ethernet (EEE 802.3) switch for switching data using a high speed IEEE 802.3 transport technology. In addition, although the disclosed embodiment describes use of xDSL modems such as ADSL modems, other DSL technologies may be used. For example, a rate adaptive digital subscriber line (RADSL) transceiver may be used for asymmetric transmittal of data for Internet applications while providing undisrupted POTS service. Hence, the RADSL transceiver may provide downstream channel data rates of 640 kbps to 7.168 Mb/s, and upstream channel data rates of 90.6 kbps to 1.088 Mb/s, as desired. Similarly, symmetrical digital subscriber line (SDSL) cards may also be used in place of the ADSL modems. Alternatively, a high bit rate digital subscriber line (HDSL) transceiver may be used for transmission of high-speed data, video and voice applications across two standard twisted pair copper wire lines at data rates of 1.54 Mb/s or 2.048 Mb/s in accordance with ANSI TR-28 and Bellcore TANWT-001210.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A remote terminal for providing communication between a central office and subscriber premises equipment within a prescribed serving area, the remote terminal comprising:

a first bus for carrying digitally multiplexed narrowband data channels to and from the central office;

a second bus for carrying digitally multiplexed broadband data channels;

a set of first subscriber line circuits, connected to the first bus, for logically connecting first subscriber loops serving a first group of subscribers to the narrowband data channels;

a set of second subscriber line circuits, connected to the first bus and the second bus, for logically connecting second subscriber loops serving a second group of subscribers to the narrowband data channels and the broadband channels; and a terminal controller for controlling logical connections between the first subscriber loops and the narrowband data channels, and between the second subscriber loops and the narrowband data channels and the broadband channels.

2. The remote terminal of claim 1, further comprising:

an optical interface for receiving an optical fiber carrying narrowband data on the narrowband channels from the central office;

a time slot interchange for selectively outputting the narrowband data received by the optical interface to the first bus; and a broadband data interface configured for selectively passing broadband data units, based on the respective addresses, between a broadband source and the second bus.

3. The remote terminal of claim 2, wherein the broadband data interface includes an Asynchronous Transfer Mode (ATM) switch receiving the broadband data units as ATM cells from the broadband source, the ATM switch selectively passing the ATM cells to the second bus based on the respective virtual addresses.

4. The remote terminal of claim 3, wherein each of the second subscriber line circuits comprises:

a plurality of telephone line interface units, each converting digital words received from a selected one of the narrowband channels at a prescribed time slot into a first downstream analog signal at a first prescribed frequency range for the corresponding second subscriber loop and converting first upstream analog signals received from the corresponding second subscriber loop at the first prescribed frequency range to digital words for upstream communication on one of the first and second busses;

a synchronous multiplexer/demultiplexer circuit for logically connecting selected narrowband data channels on the first bus to the telephone line interface units, respectively;

an ATM terminal adapter for outputting digital data recovered from selected ATM cells on the second bus based on a prescribed group of virtual addresses;

a plurality of digital subscriber loop modems, each modulating the corresponding digital data output from the ATM terminal adapter into a second downstream analog signal at a second prescribed frequency range and demodulating a second upstream analog signal at a third prescribed frequency range from the corresponding second subscriber loop into an upstream digital signal; and a plurality of combiner circuits, multiplexing the corresponding first and second downstream analog signals into a combined subscriber signal onto the corresponding second subscriber loop, and demultiplexing the first and second upstream analog signals to the corresponding telephone line interface unit and digital subscriber loop modem, respectively.

5. The remote terminal of claim 4, wherein each of the second subscriber line circuits further comprises a line circuit controller in communication with the terminal controller, for controlling the logical connections between the synchronous multiplexer/demultiplexer circuit and the first bus, and the logical connections between the ATM terminal adapter and the second bus.

6. The remote terminal of claim 5, wherein the terminal controller supplies logical connection data to each of the line circuit controllers to establish the logical connections between the second subscriber line circuits and the first and second busses.

7. The remote terminal of claim 3, wherein the set of first subscriber line circuits includes at least one of POTS subscriber line cards and ISDN subscriber line cards.

8. The remote terminal of claim 3, wherein each of the second subscriber line circuits are configured for outputting first narrowband subscriber data, received from the corresponding second subscriber loop on a two-way telephone channel and representing voice data, to the first bus and for outputting second narrowband subscriber data, received from the corresponding second subscriber loop on an upstream data channel and representing non-voice data, to the second bus.

9. The remote terminal of claim 8, wherein each of the second subscriber line circuits identifies data received from the corresponding second subscriber loop as one of the first narrowband subscriber data and second narrowband subscriber data based on a corresponding frequency range on the second subscriber loop.

10. The remote terminal of claim 8, wherein the second narrowband subscriber data is output by the ATM switch to the broadband source.

11. The remote terminal of claim 1, wherein each second subscriber line circuit provides a two-way communication interface between at least one corresponding subscriber premises equipment and the central office, and another two-way communication interface between the at least one corresponding subscriber premises equipment and a broadband source supplying broadband data to the remote terminal on one of the broadband data channels.

12. A remote terminal for providing communication between a central office and subscriber premises equipment within a digital loop carrier serving area, the remote terminal comprising:

digital subscriber line circuits, each receiving digitally multiplexed narrowband data channels from the central office and digitally multiplexed broadband data channels from a broadband data source, each digital subscriber line circuit configured for selectively establishing a two-way narrowband data connection between the central office and at least one corresponding subscriber loop on a corresponding selected one of the digitally multiplexed narrowband data channels, and a two-way communication interface between the at least one corresponding subscriber loop and a broadband data source on one of the digitally multiplexed broadband data channels; and a controller for logically controlling establishment of the two-way narrowband data connections and the two-way communication interfaces by the digital subscriber line circuits.

13. The remote terminal of claim 12, wherein each digital subscriber line circuit comprises:

a plurality of telephone line units, each configured for establishing the two-way narrowband data connection for the corresponding subscriber loop;

a broadband terminal adapter for selectively establishing the two-way communication interfaces by outputting broadband data streams for the subscriber loops corresponding to said each digital subscriber line circuit, the broadband terminal adapter selectively outputting the broadband data streams from the bus based on a prescribed group of virtual addresses and supplying, to the bus, upstream data from the corresponding subscriber loops; and a plurality of digital subscriber loop modems, each outputting to the corresponding subscriber loop a first modulated analog signal carrying the corresponding broadband data streams and recovering the upstream data from a second modulated analog signal supplied by the corresponding subscriber loop.

14. The remote terminal of claim 13, wherein the digital subscriber loop modems are Asymmetrical Digital Subscriber Line (ADSL) modems.

15. The remote terminal of claim 12, wherein the digital subscriber line circuits are implemented as integrated Asymmetrical Digital Subscriber Line (ADSL) plug-in cards, each serving a plurality of the subscriber loops and comprising:

at least one of a POTS line circuit and an ISDN line circuit providing the two-way narrowband data connection for each of the subscriber loops, and ADSL modems for modulating broadband data from the two-way communication interfaces onto the respective subscriber loops and outputting to the two-way communication interfaces narrowband upstream data obtained from the respective subscriber loops.

16. A multichannel information distribution system for supplying communication between a central office and subscribers in a digital loop carrier serving area, the system comprising:

a first set of optical fibers carrying digitally multiplexed voice channels from the central office;

a second set of optical fibers carrying digitally multiplexed broadband data channels from a broadband source;

a remote terminal connected to the first and second sets of optical fibers, the remote terminal having digital subscriber line circuits, each digital subscriber line circuit establishing a two-way connection between at least one subscriber premises equipment and the central office, a downstream broadband connection between the broadband source and the corresponding at least one subscriber premises equipment, and an upstream data connection between the at least one subscriber premises equipment and an information provider supplying broadband data via the corresponding downstream broadband connection; and a plurality of subscriber loops, each carrying signals between the remote terminal and the corresponding subscriber premises equipment associated with the two-way connection, the downstream broadband connection, and the upstream data connection.

17. The distribution system of claim 16, wherein the digital subscriber line circuits are implemented as integrated Asymmetrical Digital Subscriber Line (ADSL) plug-in cards, each having at least one of a POTS line circuit and an ISDN line circuit providing the two-way connection, and an ADSL modem for modulating broadband data from the downstream broadband connection onto the corresponding subscriber loop and outputting to the upstream data connection the data received from the corresponding subscriber loop for the service provider.

18. A method of providing communication between a central office and central office subscribers in a digital loop carrier serving area, the method comprising:

receiving, by a remote terminal serving the central office subscribers, digitally multiplexed voice channels from the central office via an optical fiber;

receiving digitally multiplexed broadband data channels by the remote terminal; and selectively establishing in an integrated remote terminal line card, for each subscriber loop serving a corresponding subscriber premises equipment, at least one of a two-way communication interface between the corresponding subscriber premises equipment and the central office, a downstream broadband connection for supplying broadband data from one of the broadband data channels to the corresponding subscriber loop, and an upstream data connection for outputting data received from the corresponding subscriber loop to a service provider supplying the broadband data.

19. The method of claim 18, wherein the step of receiving digitally multiplexed broadband data channels comprises receiving, via a second optical fiber, the multiplexed broadband data channels as ATM cell streams.

20. The method of claim 18, wherein the selectively establishing step comprises establishing a telephone connection between the central office and the corresponding subscriber premises equipment via the corresponding subscriber loop by:

detecting a call from the central office on an identified one of the digitally multiplexed voice channels;

outputting data from the one identified voice channel to one of a plurality of subscriber loop interfaces on the integrated remote terminal line card, the subscriber loop interfaces sending and receiving telephone signals to the subscriber loops, respectively; and outputting a telephone signal, representing the output data from the one identified voice channel, from the one subscriber loop interface onto the corresponding subscriber loop.

21. The method of claim 20, wherein the telephone signal outputting step comprises outputting the telephone signal as an analog POTS signal.

22. The method of claim 20, wherein the telephone signal outputting step comprises outputting the telephone signal as an ISDN signal.

23. The method of claim 21, wherein the selectively establishing step further comprises establishing the downstream broadband connection by:

outputting the broadband data, recovered from selected ATM cells on one of the multiplexed broadband data channels, to one of a plurality of ADSL modems, each ADSL modem serving a corresponding one of the subscriber loops;

outputting from the one ADSL modem a modulated signal carrying the broadband data; and outputting from a combiner a combined signal, carrying the modulated signal and the telephone signal, to the corresponding subscriber loop.

24. The method of claim 23, wherein the selectively establishing step further comprises establishing the upstream data connection by:

recovering the data received from the corresponding subscriber loop in the one ADSL modem; and outputting from the integrated remote terminal line card an upstream ATM cell stream carrying the recovered data received from the corresponding subscriber loop.

25. An integrated digital subscriber plug-in line card comprising:

a multiplexer/demultiplexer for logically connecting a plurality of two-way narrowband data paths serving respective subscriber loops to a bus configured for carrying digitally multiplexed narrowband data between the integrated digital subscriber plug-in line card and a central office;

telephone line interface units for connecting the two-way narrowband data paths by sending/receiving telephone signals for the respective subscriber loops;

a broadband data terminal adapter configured for receiving a digitally multiplexed broadband data stream and outputting a plurality of demultiplexed broadband data streams for the respective subscriber loops, the broadband data terminal multiplexing upstream data streams, received from the respective subscriber loops, onto the digitally multiplexed broadband data stream;

a plurality of digital subscriber loop modems for modulating the demultiplexed broadband data streams into downstream analog signals, respectively, and demodulating upstream subscriber loop control signals received from the subscriber loops into the upstream data streams, respectively; and a plurality of subscriber loop multiplexer/demultiplexer circuits for transmitting the downstream analog signals and the telephone signals to the respective subscriber loops at first and second signal channels, respectively, and demultiplexing the upstream subscriber loop signals from the respective subscriber loops at a third signal channel.

26. The integrated digital subscriber plug-in line card of claim 25, further comprising a controller for controlling the selective output of the demultiplexed broadband data streams by the broadband data terminal adapter and the multiplexing of the upstream data streams based on supplied logical connection data.

27. The integrated digital subscriber plug-in line card of claim 26, wherein the controller dynamically controls the logical connections by the multiplexer/demultiplexer based on supplied call setup data.

28. The integrated digital subscriber plug-in line card of claim 25, wherein the broadband data terminal is an ATM adapter configured for outputting the demultiplexed broadband data streams based on reception of ATM cell streams in the digitally multiplexed broadband data stream having prescribed virtual address information.

29. The integrated digital subscriber plug-in line card of claim 28, wherein the ATM adapter outputs each demultiplexed broadband data stream as one of the ATM cell streams having a prescribed virtual address, each digital subscriber loop modem modulating the corresponding ATM cell stream into the corresponding downstream analog signal.

30. The integrated digital subscriber plug-in line card of claim 28, wherein the ATM adapter recovers the broadband data streams from the received ATM cell streams.

31. The integrated digital subscriber plug-in line card of claim 25, wherein the telephone line interface units are POTS interface circuits.

32. The integrated digital subscriber plug-in line card of claim 25, wherein the telephone line interface units are ISDN interface circuits.

33. The integrated digital subscriber plug-in line card of claim 25, further comprising a plug-in connector interface for connecting the multiplexer/demultiplexer and the broadband terminal adapter to the bus and the digitally multiplexed broadband data stream, respectively.

* * * * *